Sept. 16, 1941. F. C. SNYDER 2,255,827
MECHANISM INCLUDING A DRIVEN TOOL FOR FEEDING AND
OPERATING UPON WORK ELEMENTS
Filed June 10, 1938
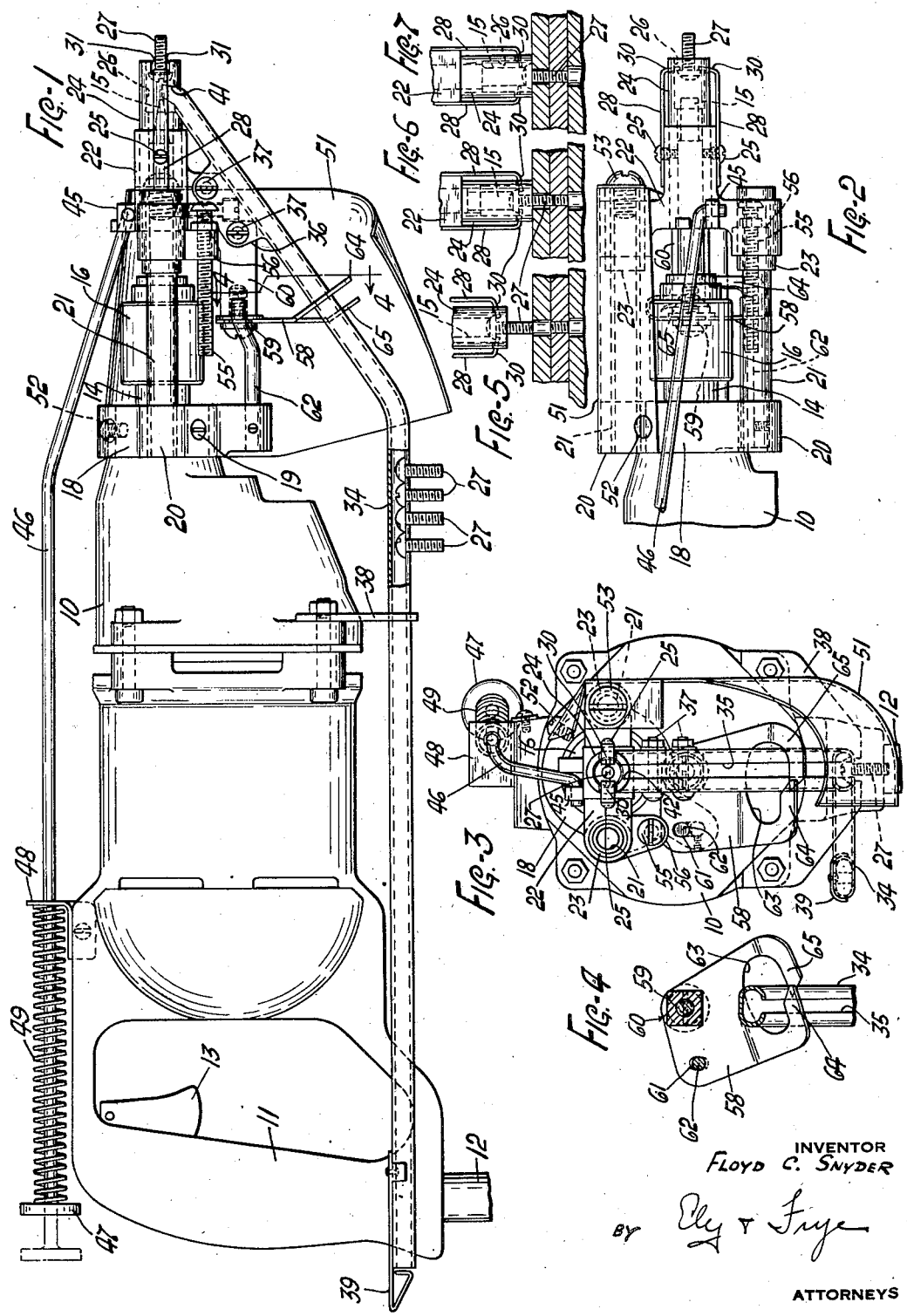
INVENTOR
FLOYD C. SNYDER
BY Ely & Frye
ATTORNEYS Patented Sept. 16, 1941

2,255,827

UNITED STATES PATENT OFFICE 2,255,827

MECHANISM INCLUDING A DRIVEN TOOL FOR FEEDING AND OPERATING UPON WORK ELEMENTS

Floyd C. Snyder, Massillon, Ohio

Application June 10, 1938, Serial No. 212,894

2 Claims. (Cl. 10—155)

This invention relates to rotary tools of the portable, power-driven type such as screw drivers and nut runners, and more especially it relates to mechanism in combination with rotary tools of the character mentioned for feeding screws, nuts, and the like, from a magazine containing a multiplicity of the same, into position in alignment with the end of the driver element so as to be operatively engaged thereby.

The chief objects of the invention are to provide a novel escapement for releasing screws or nuts one at a time from the magazine; and to provide means for limiting the distance to which a screw or nut may be driven regardless of the length of the driven screw or the receiving screw in the case of a nut. More specifically the invention aims to effect automatic disengagement of power from the tool or driver element as soon as the screw or nut reaches a predetermined position which may be as soon as it is fully set up, or prior thereto. Other objects include simplicity of construction, wide range of applicability, uniformity of work performed, and ease of operating and handling. Other objects will be manifest as the specification proceeds.

Of the accompanying drawing:

Figure 1 is a side elevation of a screw driver embodying the invention, in its preferred form, the escapement mechanism being shown in screw-releasing position;

Figure 2 is a fragmentary plan view of the structure shown in Fig. 1;

Figure 3 is an end view of the screw driver as viewed from the right of Fig. 1;

Figure 4 is a section on the line 4—4 of Fig. 1 but showing the escapement mechanism in normal position wherein it retains screws in the magazine;

Figure 5 is a fragmentary detail elevation of the driving end of the apparatus, and a screw therein showing the position of the parts with relation to the work as the screw is ready to enter the latter;

Figure 6 is a view similar to Fig. 5 showing the screw partly threaded into the work; and Figure 7 is a view similar to Figs. 5 and 6 showing the screw fully threaded into the work.

The invention has been illustrated in its application to screw drivers, but it is to be understood that the novel features of the invention are equally applicable to nut runners and the like.

Referring to the drawing, the screw storage and delivery mechanism is shown in combination with a portable, power-driven screw driver of well known construction. Said screw driver comprises the usual housing or casing 10 that encloses an electric motor (not shown), one end of said casing being formed with a pistol grip 11 through which extends an electric cable 12 for conducting electric current to said motor. A trigger switch 13 is located in the grip 11. From the opposite end of the casing 10 projects a driving spindle 14 that carries the screw driver blade or tool 15, said spindle including a chuck 16 on the outer end thereof in which the shank of the blade 15 is gripped. The screw driver shown is of the type that drives the spindle 14 through the agency of a jaw clutch (not shown) disposed within the casing 10, the arrangement being such that the clutch normally is yieldingly held in open position, but is closed to effect driving of the spindle and blade when pressure is exerted upon the screw being run, such pressure forcing the spindle rearwardly against said yielding means to effect closing of the clutch, whereupon power is delivered to the blade. Because the screw driver structure is of standard construction, further description thereof is thought not to be necessary.

The end portion of casing 10 that is remote from the grip 11 is turned down to cylindrical form and has mounted thereon an annular adapter 18 that is retained thereon by a set screw 19. At diametrically opposite points said adapter is formed with radially extending ears 20, 20, which ears are apertured to receive the end portions of respective tubular slide-guides 21, 21, said guides being permanently secured in said ears by having a force fit therein. Carried by the guides 21 is a slide 22 that is generally T-shaped in plan as shown in Fig. 2, said slide being provided with bearing bushings 23, 23 through which the respective guides 21 extend. The medial portion of the slide 22 is formed with a bore, and mounted in said bore is a tubular sleeve 24 that encompasses the screw driver blade 15, said sleeve being secured in the slide by means of cap screws 25, 25. The outer end of the sleeve 24 extends beyond the end of the blade 15 under substantially all conditions, but the distance will vary according to the position of the slide axially of the blade, as presently will be explained. The bore of the sleeve 24 is such that the shank of the blade 15 fits nicely therein, but at the outer end of the sleeve the bore in this instance is of somewhat larger diameter, as indicated at 26 so as to readily to accommodate the head of a screw 27, the latter being shown as a machine screw. For retaining a screw in the outer end of the sleeve 24 a chuck is provided, which chuck consists of a pair of spring-metal fingers 28, 28 that are secured at one end to the slide 22 by the respective screws 25 that hold the sleeve 24 in the slide, said fingers extending toward the outer end of sleeve 24, along opposite sides thereof, and having their free end portions bent toward each other as shown at 30, 30, said inturned end portions 30 extending through respective slots 31 formed in the outer end of said sleeve 24, as is best shown in Fig. 1. The adjacent chuck-ends 30 are spaced sufficiently far apart to receive the threaded portion of a screw therebetween, said ends engaging the under side of the head of the screw to prevent the same from falling by gravity from the chuck. The chuck ends 30 are sufficiently flexible, however, to enable the screw head to be forced past them when said screw is set up by the screw driver blade.

The apparatus comprises means for delivering screws 27 one at a time to the aforesaid chuck, from a supply of said screws retained in determinate position within a magazine 34. Said magazine is an elongated hollow metal structure that is C-shaped in section, and has a longitudinal slot 35 extending the entire length thereof, the heads of the screws 27 being disposed within the magazine and the threaded portions thereof projecting through the slot 35, which slot is too narrow to permit the screw heads to pass therethrough. The magazine 34 is of somewhat irregular shape due to various conditions. Longitudinally the magazine is bent so as to define an obtuse angle as shown in Fig. 1, the major portion of the magazine structure being positioned along the casing 10, and the minor, oblique portion being disposed at the driving end of the device, and being provided with an integral bracket portion 36 that is secured to a portion of the slide 22 by means of bolts 37, 37. That portion of the magazine that lies along the casing 10 is supported by a bracket 38 that is bolted to the casing and extends transversely about the magazine except in the region of the slot 35 therein, the magazine being slidable in said bracket so as to be movable longitudinally relatively thereof. The end portion of the magazine 34, in the region of grip 11, is curved laterally about said grip as shown in Fig. 3, the end of the magazine thereat, which is its upper or loading end, being provided with a yielding closure member 39 for retaining the screws in the magazine.

The opposite end of the magazine 34, which is the delivery end thereof, is disposed within a notch 41, Fig. 1, that is formed in one side of sleeve 24, between chuck members 28 and above the inturned ends 30 of the latter, said sleeve being slotted, as best shown at 42, Fig. 3, from the notch 41 to the outer end of the sleeve, said slot 42 being, in effect, a continuation of the slot 35 of the magazine. The arrangement is such that successive screws discharged from the magazine may enter into bore 26 of the sleeve 24 in such position that the heads of the screws will be engaged by the chuck members and the threaded portions of the screws will project axially beyond the outer end of the sleeve.

The slide 22 is arranged to be reciprocated axially along guides 21 relatively of the spindle 14, and this movement of the slide is utilized for operating an escapement mechanism, to cause the magazine to discharge screws one at a time as presently will be explained. For so reciprocating the slide 24, the latter is formed with an upstanding apertured lug or ear 45 in which is secured one end of a push rod 46, said push rod extending along the casing and having its other end positioned adjacent the grip 11, and provided with an enlarged head or button 47 that is engaged by the thumb of the operator when it is desired to reciprocate the slide. The push rod 46 extends freely through an apertured supporting bracket 48 on the casing 10, and there is a compression spring 49 mounted upon the push rod between said bracket 48 and the head 47. Pressure on the latter moves the slide 24 outwardly as shown in full lines in Fig. 1 of the drawing. Release of the pressure enables the spring 49 to retract the slide and other elements to original position, the original position of the head 47 being indicated in broken lines in Fig. 1.

In the projected position of the slide 22, it is necessary that the delivery end of magazine 34 be beyond the end of screw driver blade 15 in order that the screws 27 freely may enter bore 26 of sleeve 24, but further projection of the slide is neither required nor desired and for this reason a slide-limiting means is provided. Said slide-limiting means consists of a sheet metal plate 51 that is secured to the adapter 18 by screw 52, and is secured to one of the slide-guides 21 (the guide at the right as viewed in Fig. 3), by a screw 53 that is threaded into the outer end of said guide. Thus in the projected position of the slide 22, bushing 23 thereof will abut that portion of plate 51 that overlies the end of guide 21, whereby further projected movement of the slide is prevented. The plate 51 is arcuate, and curves about the magazine 34 in spaced relation thereto, said plate thus constituting a hand-grip that may be grasped by the left hand of the operator as his right hand grasps the grip 11.

As previously stated, the slide 22 and elements carried thereby are retracted by means of the spring 49, and in fully retracted position the outer end of the sleeve 24 is disposed a little beyond the end of screw driver blade 15, as shown in Fig. 7, the arrangement being such as to prevent further movement of the casing 10 toward the structure into which the screw is being threaded. This condition obtains, however, only in the case of screws having projecting heads. In cases where the heads of the screws are to be countersunk, a slightly different adjustment will be necessary. For this reason the slide 24 is provided with adjustable means for limiting its retractive movement, said means consisting of a stop-screw 55 that is threaded through an ear 56 formed on the slide 24 and retained in adjusted position by means of a lock nut. The stop-screw 55 projects rearwardly from the slide in the direction of the adapter 18, and abuts the latter in the fully retracted position of the slide. By adjusting the screw 55, the retracted position of the slide may be altered in view of the particular type of screws to be driven.

Screws 27 in the magazine 34 are released therefrom, one at a time, and descend by gravity into the screw-clutch when the apparatus is held in vertical or operative position. Release of the screws from the magazine is automatic when the push-rod 46 is operated to project the slide 22 outwardly, and to this end an escapement is provided. Said escapement comprises a depending metal plate 58 that is swiveled at 59 upon the end of a rearwardly projecting lug 60 that is integral with the slide 22. Laterally of its pivot 59 the escapement plate 58 is formed with an aperture 61 through which extends a heavy bent rod 62 that constitutes a cam, said rod or cam 62 being mounted at one of its ends in the adapter 18. The arrangement is such that the plate 58 moves longitudinally of the cam 62 as the slide 22 is projected and retracted, and the shape of the cam is such as to impart a back and forth oscillatory movement to the free end of the plate as the slide is so moved. The plate 58 extends transversely of the magazine 34, and has a large recess 63 through which said magazine extends. On that side of the magazine 34 that includes the slot 35, the plate 58 is formed with a pair of fingers 64, 65, which fingers are disposed in spaced, parallel planes, the free ends of the fingers slightly overlapping each other. The distance between fingers 64, 65 is slightly greater than the threaded portion of a screw 27.

When the slide 22 is in retracted position, the escapement plate 58 is in the angular position shown in Fig. 4, in which position the finger 64 extends across slot 35 of the magazine and prevents the screws 27 from sliding to the delivery end of the magazine. Finger 65 is disposed laterally of said slot and rearwardly of finger 64. When the push rod 46 is pressed to project the slide 22, cam 62 causes the escapement plate to swing to the angular position shown in Fig. 3. This causes finger 64 to move away from in front of the slot 35 and enables one screw to move down the magazine, the finger 65 concurrently moving across the slot in front of the succeeding screw in the magazine to prevent the remainder of the screws from following. When the slide is retracted, the escapement again assumes the position shown in Fig. 4, and the screw that was engaged by finger 65 moves forward into engagement with finger 64.

To obtain optimum results, it is important that the apparatus be properly adjusted to the particular screws to be run. To adjust the device, the screw driver blade is pressed axially inwardly to move the jaws of the clutch in the casing 10 toward each other until they are just short of closed or driving engagement with each other. Then a screw is held with its driving slot in engagement with the blade 15, and the adjustment screw 55 is turned until the outer end of the sleeve 24 is flush with the flat face on the under side of the screw head, the end of the adjustment screw bearing against adapter 18. When thus adjusted, the apparatus is ready for operation. The next step is to depress push rod 46 and thereby to project the slide 22 and concurrently to operate the escapement to cause a screw 27 to descend from the magazine and to be positioned by the chuck springs 28 within the end of sleeve 24, beyond the end of the blade 15, as shown in Fig. 1. When the operator releases the pressure on push rod 46, the spring 49 retracts the slide until the blade 15 engages the head of the screw 27, as shown in Fig. 5, the stiffness of the said chuck springs being sufficient to prevent complete retraction of the slide by spring 49. The apparatus is now ready to run the screw into the work, the initial position of the various elements being shown in Fig. 5. As the operator presses the screw driver forwardly toward the work, the blade is forced rearwardly to close the clutch within the casing 10. Pressure on the trigger switch 13 then starts the motor within the casing to turn the blade and thus to thread the screw into the work. As the screw enters the work the entire structure follows forwardly toward the work until the work is engaged by the end of sleeve 24, as shown in Fig. 6, thereby preventing further movement of the slide 22. Then the pressure exerted by the operator causes the screw driver blade to force the screw axially of the stationary sleeve so that the screw head is forced past the chuck springs 28. At about this time the adapter 18 strikes the stationary adjustment screw 55 of the slide, thus preventing further forward movement of the casing 10. The blade 15 continues to rotate, and as the screw 27 moves farther into the work, the blade and its spindle 14 follow the screw and move axially a sufficient distance to open the clutch within the casing 10, thus depriving the spindle of power and causing the blade to come to rest in the position shown in Fig. 7. The original adjustment of the apparatus is such that the spindle-driving clutch opens at the same time the screw is fully set up. This completes a cycle of operation, which may be repeated in rapid succession as long as there are screws in the magazine.

The invention saves time and labor on operations requiring the mounting of large numbers of screws. The screw feeding attachment is readily adaptable to various types of power operated screw drivers, and it is light in weight so as to add but little burden to the operator. An important feature of the invention is the disengagement of the power drive automatically as the screw is fully set up. This relieves the apparatus of severe torsional strains such as obtain when a friction drive is used, and also imposes no strain upon the operator. Furthermore, the screws are set up to uniform tightness, and danger of the stripping of threads is obviated.

Although the invention is shown and described in its application to the mounting of machine screws, it will handle wood screws and any other types of screws having slotted heads with equal facility. The invention also may be used for the mounting of screws that have square or hexagonal heads without slots, in which case it is only necessary to substitute a socket wrench for the blade 15. In like manner a socket wrench is provided when the tool is utilized for running nuts onto screws or threaded studs, the magazine however, being somewhat modified so that the nuts therein will move parallel to their own axes.

Modification may be resorted to without departing from the spirit of the invention or the scope thereof as defined by the appended claims.

What is claimed is:

1. In a power operated tool comprising a casing having a driven tool at one end thereof, a slide carried by said casing and having a sleeve that surrounds said tool, means for reciprocating said slide longitudinally with relation to said tool, a magazine for threaded work elements carried by said slide and discharging into said sleeve beyond the end of said tool, and escapement means for releasing work elements one at a time from said magazine upon reciprocation of said slide, said means comprising an escapement plate pivotally mounted on said slide, and a cam carried by said casing and adapted to effect oscillation of said escapement plate, said cam consisting of a bent rod that is disposed substantially parallel to the path of movement of the slide and extends through an aperture in the escapement plate.

2. In a power operated tool comprising a casing having a driven tool extending from one end thereof, a slide carried by said casing and having a sleeve that surrounds said tool, means for manually reciprocating said slide longitudinally with relation to said tool, a magazine for threaded work elements carried by said slide and discharging into said sleeve beyond the end of said tool, releasable means mounted in said sleeve adapted to support work elements delivered thereto from said magazine, and escapement means for releasing work elements one at a time from said magazine in timed relation to reciprocation of the slide, said escapement means comprising an escapement plate pivotally mounted on said slide, and a cam consisting of a bent rod that is mounted on the casing and extends through an aperture in said escapement plate for effecting oscillation thereof as the slide reciprocates.

FLOYD C. SNYDER.